United States Patent
Fujiwara

(10) Patent No.: US 9,550,698 B2
(45) Date of Patent: Jan. 24, 2017

(54) OPTICAL GLASS AND USE THEREOF

(71) Applicant: Yasuhiro Fujiwara, Tokyo (JP)

(72) Inventor: Yasuhiro Fujiwara, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/411,730

(22) PCT Filed: Jun. 21, 2013

(86) PCT No.: PCT/JP2013/067117
§ 371 (c)(1),
(2) Date: Dec. 29, 2014

(87) PCT Pub. No.: WO2014/002903
PCT Pub. Date: Jan. 3, 2014

(65) Prior Publication Data
US 2015/0175475 A1   Jun. 25, 2015

(30) Foreign Application Priority Data

Jun. 28, 2012 (JP) ................. 2012-145484
Jun. 28, 2012 (JP) ................. 2012-145485

(51) Int. Cl.
*C03C 3/21* (2006.01)
*C03B 11/00* (2006.01)
*G02B 1/00* (2006.01)
*C03C 1/00* (2006.01)

(52) U.S. Cl.
CPC ............... *C03C 3/21* (2013.01); *C03B 11/00* (2013.01); *C03C 1/00* (2013.01); *G02B 1/00* (2013.01); *C03B 2215/40* (2013.01)

(58) Field of Classification Search
CPC ............. C03C 3/21; C03C 1/00; C03B 11/00; C03B 2215/40
See application file for complete search history.

(56) References Cited

U.S. PATENT DOCUMENTS

2011/0287264 A1   11/2011   Wada et al.
2012/0142516 A1   6/2012    Fujiwara

FOREIGN PATENT DOCUMENTS

| CN | 102557435 A | 7/2012 |
|---|---|---|
| JP | 2006-111499 A | 4/2006 |
| JP | 2007-015904 A | 1/2007 |
| JP | 2012-091989 A | 5/2012 |
| TW | 200829529 A | 7/2008 |
| TW | 201036928 A | 10/2010 |
| WO | 2010/084925 A1 | 7/2010 |
| WO | 2012/043815 A1 | 4/2012 |

OTHER PUBLICATIONS

Sep. 17, 2013 Search Report issued in International Application No. PCT/JP2013/067117.
Dec. 31, 2014 International Preliminary Report on Patentability issued in International Application No. PCT/JP2013/067117.
Mar. 22, 2016 Office Action issued in Japanese Patent Application No. 2012-145484 (with concise explanation of the relevance).
Mar. 22, 2016 Office Action issued in Japanese Patent Application No. 2012-145485 (with concise explanation of the relevance).
Mar. 24, 2016 Office Action issued in Chinese Patent Application No. 201380033257.
Aug. 26, 2016 Office Action issued in Taiwanese Patent Application No. 102122647.
Oct. 11, 2016 Office Action issued in Chinese Patent Application No. 201380033257.0.

*Primary Examiner* — Elizabeth A Bolden
(74) *Attorney, Agent, or Firm* — Oliff PLC

(57) ABSTRACT

An aspect of the present invention relates to optical glass, which is oxide glass including cation components in the form of 10 to 40 cation % of $P^{5+}$, equal to or more than 50 cation % of a combined quantity of $Ti^{4+}$, $Nb^{5+}$, $W^{6+}$, $Bi^{3+}$, and $Te^{4+}$, with a cation ratio of a combined content of $Ti^{4+}$ and $Nb^{5+}$ to a combined content of $W^{6+}$ and $Bi^{3+}$ being equal to or less than 1.3, a combined quantity of $B^{3+}$, $Li^+$, $Na^+$, $K^+$, $Rb^+$, $Cs^+$, $Mg^{2+}$, $Ca^{2+}$, $Sr^{2+}$, $Ba^{2+}$, and $Zn^{2+}$ which amounts to equal to or less than ⅓ of a combined content of $Ti^{4+}$, $Nb^{5+}$, $W^{6+}$, $Bi^{3+}$, and $Te^{4+}$, and more than 0 % of $Li^+$, $Na^+$, $K^+$, $Rb^+$, and $Cs^+$ combined, and which has a refractive index of equal to or higher than 2.02.

13 Claims, No Drawings

OPTICAL GLASS AND USE THEREOF

CROSS-REFERENCE TO RELATED APPLICATIONS

This application claims the benefit of priority to Japanese Patent Application Nos. 2012-145484 and 2012-145485 filed on Jun. 28, 2012, which are expressly incorporated herein by reference in their entirety.

TECHNICAL FIELD

An aspect of the present invention relates to high refractive index optical glass, a method of manufacturing the same, a press molding glass material and optical element comprised of the optical glass, and a method of manufacturing the optical element.

BACKGROUND ART

For achieving a high degree of functionality and compactness in optical imaging systems and optical projection systems, an optical element comprised of optical glass of high refractive index, such as the optical glass described in Japanese Unexamined Patent Publication (KOKAI) No. 2012-91989 and English language family member U.S.2012/142516A1, which are expressly incorporated herein by reference in their entirety, is effective.

SUMMARY OF THE INVENTION

In the common process of manufacturing optical glass, a melting vessel made of a refractory material, such as a quartz crucible, is employed to roughly melt compound materials (batch starting materials) and prepare a cullet starting material. Next, the cullet starting material is melted, refined, and homogenized using a melting vessel made of noble metal, such as platinum or gold, and the glass melt obtained is molded to obtain optical glass. The refining conducted following melting is a step that is conducted to remove the bubbles in the glass melt. The temperature of the glass melt is raised to lower its viscosity, promoting the removal of bubbles from the glass.

When the content of high refractive index components is increased to raise the refractive index of the glass, the contents of phosphoric acid components, boric acid components, alkali metal components, divalent metal components, and the like that can function to improve the melting property of the glass undergo a relative decrease. As a result, the melting property of the glass tends to deteriorate. Thus, in conventional high refractive index glasses, measures such as raising the melting temperature, extending the melting period and the like have been adopted to completely melt the glass starting materials.

As set forth above, because the temperature of the glass melt is raised during refining, the refining temperature becomes higher than the melting temperature. Accordingly, when the melting temperature is raised, the refining temperature rises with it. In conventional high refractive index glasses, to achieve the viscosity suited to the removal of bubbles from the glass, the refining temperature normally exceeds 1,100° C., and not uncommonly exceeds 1,400° C. However, when the temperature of the glass is raised in the melting step and in the refining step, high refractive index components such as $Ti^{4+}$, $Nb^{5+}$, $W^{6+}$, $Bi^{3+}$, and $Te^{4+}$ are reduced, and coloration of the glass (so-called reduction color) increases. The metal materials such as platinum and gold constituting the glass melting vessel dissolve into the glass as ions, and the phenomena of class coloration and/or the increased presence of foreign material may end up occurring in the glass.

An aspect of the present invention provides for optical glass that exhibits good melting property while being high refractive index glass.

In the usual process of manufacturing optical glass, cullet starting materials are melted to obtain a melt, after which the temperature of the melt is raised to conduct refining. Following refining, the temperature of the melt is lowered, after which the glass is caused to flow out and molded. In the rough melting in the preparation of cullet starting materials, highly erosive property may be exhibited in the step of melting the batch starting materials, so this step is conducted using a melt apparatus made of a refractory material such as quartz. However, when a vessel made of refractory material is employed in the process of melting the cullet starting materials, refining, and homogenizing, the refractory material dissolves into the glass. That makes it difficult to obtain a homogeneous glass melt, and the optical characteristics, such as the refractive index, end up varying. Thus, it is desirable to use a vessel made of noble metal such as platinum or gold. Among the series of steps that are conducted using a noble metal vessel in this manner, the temperature of the glass melt is highest during refining. Refining is desirably conducted at a temperature at which the viscosity of the glass melt reaches about 1.0 dPa·s so as to cause bubbles in the glass melt to rise and tend to be discharged. For these reasons, with high refractive index glass, such as glass with a refractive index nd exceeding 2.0, the melting temperature and refining temperature will generally be high; it is not unusual for the refining temperature to exceed 1,400° C. However, when melting and refining are conducted at elevated temperatures, as set forth above, the glass may develop color and/or foreign material may end up increasing in the glass.

By contrast, the present inventor conducted extensive research resulting in the discovery that by employing a $P^{5+}$-containing oxide glass composition as a base and incorporating the refractive index-raising components $Ti^{4+}$, $Nb^{5+}$, $W^{6+}$, $Bi^{3+}$, and $Te^{4+}$ and components that can serve to enhance the melting property of the glass in the form of $B^{3+}$, $Li^+$, $Na^+$, $K^+$, $Rb^+$, $Cs^+$, $Mg^{2+}$, $Ca^{2+}$, $Sr^{2+}$, $Ba^{2+}$, and $Zn^{2+}$ in prescribed proportions, it was possible to impart viscosity characteristics such that the refining temperature became equal to or lower than 1,100° C., for example, while keeping the refractive index nd within a range exceeding 2.0, specifically equal to or higher than 2.02. Thus, it was possible to obtain high refractive index glass free of bubble removal defects while inhibiting increased coloration and foreign material in the glass caused by a rise in the melting temperature and refining temperature. An aspect of the present invention was devised on this basis.

An aspect of the present invention relates to:

optical glass (referred to as "optical glass A", hereinafter), which is oxide glass comprising cation components in the form of:

10 to 40 cation % of $P^{5+}$;

equal to or more than 50 cation % of a combined quantity of $Ti^{4+}$, $Nb^{5+}$, $W^{6+}$, $Bi^{3+}$, and $Te^{4+}$, with a cation ratio of a combined content of $Ti^{4+}$ and $Nb^{5+}$ to a combined content of $W^{6+}$ and $Bi^{3+}$, $(Ti^{4+}+Nb^{5+})/(W^{6+}+Bi^{3+})$, being equal to or less than 1.3;

a combined quantity of $B^{3+}$, $Na^+$, $K^+$, $Rb^+$, $Cs^+$, $Mg^{2+}$, $Ca^{2+}$, $Sr^{2+}$, $Ba^{2+}$, and $Zn^{2+}$ which amounts to equal to or less than ⅓ of a combined content of $Ti^{4+}$, $Nb^{5+}$, $W^{6+}$, $Bi^{3+}$, and $Te^{4+}$; and more than 0% of $Li^+$, $Na^+$, $K^+$, $Rb^+$, and $Cs^+$ combined; and which has a refractive index of equal to or higher than 2.02.

In an embodiment, optical glass A comprises 0 to 4 cation % of $Te^{4+}$ as a cation component.

In an embodiment, optical glass A has an Abbé number vd of equal to or lower than 18.0.

As set forth above, measures such as raising the melting temperature, lengthening the melting time and the like have been adopted to fully melt glass starting materials with poor melting property in conventional high refractive index glasses. However, in conventional high refractive index glasses that have been melted at high melting temperatures, phenomena such as glass coloration and/or the occurrence of foreign material in the glass have been observed, making it difficult to obtain optical glasses that are suitable as optical element materials.

A further aspect of the present invention provides for optical glass exhibiting good melting property while being high refractive index glass.

As set forth above, in the common method of manufacturing optical glass, the temperature of the glass melt is raised to conduct refining. To obtain a homogeneous glass melt, it is desirable to employ a vessel made of noble metal such as platinum or gold. However, when the temperature of the glass melt rises, phenomena such as high refractive index components such as $Ti^{4+}$, $Nb^{5+}$, $Bi^{3+}$, and $Te^{4+}$ being reduced and increasing coloration of the glass (so-called reduction color), metal materials such as platinum and gold that constitute the glass melting vessel dissolving into the glass as ions and causing coloration of the glass, and increased foreign material in the glass end up occurring.

Among the above series of steps employing a noble metal vessel, the temperature of the glass melt is highest during refining. Accordingly, the present inventor conducted extensive research into how to lower the temperature of the glass melt during refining of high refractive index glass. As a result, he discovered that it was possible to obtain high refractive index glass without bubble removal defects while inhibiting an increase in the coloration and foreign material in the glass by imparting a viscosity characteristic that yielded a refining temperature of equal to or lower than 1,100° C., specifically, by imparting a viscosity characteristic that yielded a temperature at which the viscosity of 1.0 dPa·s was achieved of equal to or lower than 1,100° C., while remaining in the range of a refractive index nd exceeding 2.0, specifically equal to or higher than 2.02. Refining was desirably conducted at a temperature at which the viscosity of the glass melt became about 1.0 dPa·s so that gas bubbles in the glass melt tended to be discharged from the melt. Accordingly, the lower the temperature yielding a viscosity of the glass melt of 1.0 dPa·s, the lower the temperature at which refining could be conducted, making it possible to inhibit coloration and/or the generation of foreign material due to elevating the temperature of the glass melt.

An aspect of the present invention was devised based on this discovery.

An aspect of the present invention relates to optical glass (referred to as "optical glass B", hereinafter), which has a refractive index nd of equal to or higher than 2.02 and a temperature at which viscosity becomes 1.0 dPa·s of equal to or lower than 1,100° C.

In an embodiment, optical glass B comprises 0 to 4 cation % of $Te^{4+}$ as a cation component.

In an embodiment, the viscosity at the liquidus temperature of optical glass B is equal to or higher than 1.0 dPa·s.

In an embodiment, the liquidus temperature of optical glass B is equal to or lower than 1,100° C.

In an embodiment, the refractive index nd and Abbé number vd of optical glass B satisfy relational equation (1) below:

$$vd < 39.0 - 10 \times nd \qquad (1).$$

In an embodiment, optical glass B comprises equal to or more than 10 cation % of $P^{5+}$ as a cation component among the glass components.

In an embodiment, optical glass B comprises equal to or more than 50 cation % of $Ti^{4+}$, $Nb^{5+}$, $Bi^{3+}$, $W^{6+}$, and $Te^{4+}$ combined as cation components among the glass components.

A further aspect of the present invention relates to a method of manufacturing optical glass, which comprises melting glass starting materials by heating to prepare glass melt, refining the glass melt, and molding the glass melt that has been refined; and blending the glass starting materials so as to obtain the optical glass A or B.

In an embodiment, the melting is conducted using a glass melting vessel made of platinum, platinum alloy, gold, or gold alloy.

A further aspect of the present invention relates to a press molding glass material, which is comprised of the optical glass A or B.

A further aspect of the present invention relates to an optical element, which is comprised of the optical glass A or B.

A further aspect of the present invention relates to a method of manufacturing an optical element, which comprises:

preparing optical glass by processing the above optical glass or by the above method; and processing the optical glass that has been prepared to provide an optical element.

An aspect of the present invention makes it possible to achieve both a higher refractive index and improved melting property in optical glass. Accordingly, it becomes possible to provide optical glass in which a rise in the melting temperature is inhibited while having a refractive index nd of equal to or higher than 2.02. By means of optical glass having good melting property, it is possible to obtain homogeneous glass without excessively raising the glass melting temperature or excessively extending the melting time. Thus, it is possible to inhibit an increase in coloration due to the reduction in the melt of components imparting a high refractive index, such as $Ti^{4+}$, $Nb^{5+}$, $W^{6+}$, $Bi^{3+}$, and/or coloration of the glass due to materials such as noble metal constituting the melting vessel dissolving into the glass melt.

A further aspect of the present invention makes it possible to provide press molding glass materials and optical elements comprised of the above optical glass, such as optical elements suited to more compact, more highly functional optical systems such as imaging optical systems and projection optical systems, as well as methods of manufacturing the same.

Modes for Carrying Out the Invention

Optical Glass A

Optical glass A is optical glass, which is oxide glass comprising cation components in the form of 10 to 40 cation % of $P^{5+}$; equal to or more than 50 cation % of a combined quantity of $Ti^{4+}$, $Nb^{5+}$, $W^{6+}$, $Bi^{3+}$, and $Te^{4+}$, with a cation ratio of a combined content of $Ti^{4+}$ and $Nb^{5+}$ to a combined content of $W^{6+}$ and $Bi^{3+}$, $(Ti^{4+}+Nb^{5+})/(W^{6+}+Bi^{3+})$, being equal to or less than 1.3; a combined quantity of $B^{3+}$, $Li^+$, $Na^+$, $K^+$, $Rb^+$, $Cs^+$, $Mg^{2+}$, $Ca^{2+}$, $Sr^{2+}$, $Ba^{2+}$, and $Zn^{2+}$ which amounts to equal to or less than ⅓ of a combined content of $Ti^{4+}$, $Nb^{5+}$, $W^{6+}$, $Bi^{3+}$, and $Te^{4+}$; and more than 0% of $Li^+$, $Na^+$, $K^+$, $Rb^+$, and $Cs^+$ combined; and which has a refractive index of equal to or higher than 2.02.

Optical glass A can exhibit good glass melting property while being glass with an extremely high refractive index nd of equal to or higher than 2.02. Thus, there is no need to raise the melting temperature excessively high, the erosion of glass melting vessel materials such as platinum and gold can be reduced, and coloration of the glass due to dissolving of these metal materials can be diminished. Because bubble removal can be also good without raising the refining temperature excessively high, it is possible to obtain optical glass of high homogeneity.

[Glass Composition]

The composition of optical glass A will be described in detail below.

Optical glass A is oxide glass the main anion component of which is $O^{2-}$. An $O^{2-}$ content of 90 to 100 anion % can be thought of as a yardstick. When the $O^{2-}$ content is within the above range, other anion components in the form of $F^-$, $Cl^-$, $Br^-$, $S^{2-}$, $Se^{2-}$, $N^{3-}$, $NO_3^-$, $SO_4^{2-}$ and the like can also be incorporated. In that case, the total content of $F^-$, $Cl^-$, $Br^-$, $I^-$, $S^{2-}$, $Se^{2-}$, $N^{3-}$, $NO_3^-$, $SO_4^{2-}$ can be, for example, 0 to 10 anion %. The $O^{2-}$ content can also be 100 anion %.

The cation components will be described next. Below, unless specifically stated otherwise, the contents and combined contents of cation components are given as cation %.

$P^{5+}$ is a glass network forming component that is an essential component of optical glass A. It has the effect of enhancing the thermal stability of the glass, and is a component that functions to inhibit a rise in the temperature at which the glass exhibits the viscosity suited to bubble removal (desirably a viscosity of about 1.0 dPa·s) while lowering the liquidus temperature. When the $P^{5+}$ content is less than 10%, it becomes difficult to achieve these effects. When the $P^{5+}$ content exceeds 40%, the refractive index decreases and the tendency of the glass to crystallize increases. Thus, the $P^{5+}$ content is 10 to 40%. The lower limit of the $P^{5+}$ content is desirably 12% and, in increasing order of preference, 14%, 16%, 18%, 20%, 22%, 24%, and 26%. The upper limit of the $P^{5+}$ content is desirably 38% and, in increasing order of preference, 35%, 33%, 31%, 30%, 29%, and 28%.

Each of $Ti^{4+}$, $Nb^{5+}$, $W^{6+}$, $Bi^{3+}$, and $Te^{4+}$ functions to raise the refractive index. To achieve a refractive index nd of equal to or higher than 2.02, the combined content of $Ti^{4+}$, $Nb^{5+}$, $W^{6+}$, $Bi^{3+}$, and $Te^{4+}$ is set to equal to or more than 50%. In order to achieve glass with a higher refractive index, the lower limit of the combined content of $Ti^{4+}$, $Nb^{5+}$, $W^{6+}$, $Bi^{3+}$, and $Te^{4+}$ is desirably, in increasing order of preference, 56%, 57%, 58%, 59%, and 60%. When the combined content of $Ti^{4+}$, $Nb^{5+}$, $W^{6+}$, $Bi^{3+}$, and $Te^{4+}$ is excessively high, the thermal stability of the glass decreases. Thus, the upper limit of the combined content of $Ti^{4+}$, $Nb^{5+}$, $W^{6+}$, $Bi^{3+}$, and $Te^{4+}$ is desirably 75% and, in increasing order of preference, 72%, 70%, 68%, and 66%.

Among $Ti^{4+}$, $Nb^{5+}$, $W^{6+}$, and $Bi^{3+}$, the components that yield advantageous effects in terms of lowering the temperature at which the glass melt exhibits the viscosity of 1.0 dPa·s are $W^{6+}$ and $Bi^{3+}$. Accordingly, in optical glass A, to inhibit a rise in the temperature at which the glass melt exhibits the viscosity of 1.0 dPa·s, the cation ratio of the combined total of $Ti^{4+}$ and $Nb^{5+}$ to the combined total of $W^{6+}$ and $(Ti^{4+}+Nb^{5+})/(W^{6+}+Bi^{3+})$, is set to equal to or less than 1.3. When the cation ratio of $((Ti^{4+}+Nb^{5+})/(W^{6+}+Bi^{3+})$ exceeds 1.3, the temperature range that effectively inhibits an increase in coloration during glass melting rises; for example, the refining temperature rises above the temperature range of equal to or lower than 1,100° C. To inhibit a rise in the refining temperature and inhibit increased coloration of the glass, the cation ratio of $((Ti^{4+}+Nb^{5+})/(W^{6+}+Bi^{3+}))$ is desirably kept to within the range of equal to or less than 1.2 and, in increasing order of preference, the upper limit is kept to 1.15, 1.10, 1.05, 1.00, and 0.90.

As set forth above, Ti4+, Nb5+, W6+, Bi3+, and Te4+ affect the melting property differently. However, when present together, the overall tendency is one of deterioration of the melting property of the glass, such that if one component vitrifies, the remaining components remain unmelted in the glass, or when an attempt is made to vitrify all of the components, other components compromise coloration of the glass.

B3+, Li+, Na+, K+, Rb+, Cs+, Mg2+, Ca2+, Sr2+, Ba2+, and Zn2+serve to improve the melting property of the glass.

In optical glass A, the upper limit of the combined content of B3+, Li+, Na+, K+, Rb+, Cs+, Mg2+, Ca2+, Sr2+, Ba2+, and Zn2+is specified based on the ratio to the combined content of Ti4+, Nb5+, W6+, Bi3+, and Te4+to maintain a high refractive index characteristic. That is, the combined content of B3+, Li+, Na+, K+, Rb+, Cs+, Mg2+, Ca2+, Sr2+, Ba2+and Zn2+is set to equal to or less than ⅓ the combined content of Ti4+, Nb5+, W6+, Bi3+, and Te4+. Further, the combined content of Li+, Na+, K+, Rb+, and Cs+, which effectively enhance the melting property, is set to more than 0%. Doing this can yield optical glass with a refractive index nd of equal to or higher than 2.02 and with a good melting property.

The upper limit of the cation ratio of the combined content of B3+, Li+, Na+, K+, Rb+, Cs+, Mg2+, Ca2+, Sr2+, Ba2+, and Zn2+to the combined content of Ti4+, Nb5+, W6+, Bi3+, and Te4+((B3++Li++Na++K++Rb++Cs++Mg2++Ca2++Sr2++Ba2++Zn2+)/(Ti4++Nb5++W6++Bi3++Te4+)) is desirably 3/10, preferably ¼, and more preferably 9/40. The lower limit is desirably 4/30, preferably 3/20, more preferably ⅙.

$Ti^{4+}$ is a component that serves to raise the refractive index and increase dispersion of the glass. It is an optional component that serves to maintain the thermal stability of the glass in the presence of $Bi^{3+}$ and $Nb^{5+}$. Accordingly, the content can be 0%. It also serves to increase the chemical durability of the glass and increase the mechanical strength of the glass. When the $Ti^{4+}$ content exceeds 15%, the thermal stability decreases, the tendency to crystallize increases, the melting property deteriorates, and the liquidus temperature rises markedly. In addition, the absorption end of the spectral transmittance characteristics tends to exhibit a longer wavelength in spectral transmission characteristics, resulting in tendency of bister coloration of glass. Accordingly, the $Ti^{4+}$ content is desirably kept to 0 to 15%. The upper limit of the $Ti^{4+}$ content is desirably 14%, preferably 13%, more preferably 12%, still more preferably 11%, and yet still more preferably, 10%. The lower limit of the $Ti^{4+}$ content is desirably 2%, preferably 3%, more preferably 4%, still more preferably 5%, and yet still more preferably, 6%, 7%, and 8%.

$Nb^{5+}$ is a component that serves to raise the refractive index and increase dispersion of the glass. It is an optional component that serves to maintain the thermal stability of the glass in the presence of $Bi^{3+}$ and $Ti^{4+}$. It also serves to enhance the chemical durability of the glass and increase the mechanical strength of the glass. To achieve the desired high refractive index and high dispersion characteristics while maintaining thermal stability, the $Nb^{5+}$ content is desirably equal to or more than 10%, preferably equal to or more than 12%, and more preferably, equal to or more than 13%, equal to or more than 14%, and equal to or more than 15%. When the $Nb^{5+}$ content is excessive, the thermal stability of the glass decreases, the liquidus temperature rises markedly, and the absorption end of the spectral transmittance characteristics tends to exhibit a somewhat longer wavelength. Accordingly, the $Nb^{5+}$ content is desirably equal to or less than 24% and, in increasing order of preference as the upper limit thereof, 23%, 22%, 21%, 20%, and 19%.

$W^{6+}$ is an optional component that serves to raise the refractive index, increase the dispersion of the glass, enhance the chemical durability of the glass, and increase the mechanical strength of the glass. Accordingly, the content thereof can be 0%. When the $W^{6+}$ content is excessive, the thermal stability of the glass decreases, the liquidus temperature tends to rise, the glass exhibits a bluish-gray coloration, and the absorption end of the spectral transmittance characteristics tends to exhibit a longer wavelength. Accordingly, the $W^{6+}$ content is desirably kept to equal to or less than 19%. The upper limit of the $W^{6+}$ content is preferably 18% and, in increasing order of preference, 17%, 16%, 15%, 14%, 13%, and 12%.

$Bi^{3+}$ is a component that raises the refractive index and increases dispersion. The incorporation of a suitable quantity serves to improve the thermal stability of the glass. When the $Bi^{3+}$ content is excessive, thermal stability decreases, the liquidus temperature rises, the glass exhibits a bister coloration, and the absorption end of the spectral transmittance characteristics tends to exhibit a longer wavelength. Accordingly, the upper limit of the $Bi^{3+}$ content is desirably kept to equal to or less than 33%, in increasing order of preference, to 32%, 31%, 30%, 29%, and 28%. The lower limit of the content is desirably 16% and, in increasing order of preference, 17%, 18%, 19%, and 20%.

$Te^{4+}$ serves to raise the refractive index, increase the dispersion of the glass, and enhance the thermal stability of the glass. Taking into account the thermal stability of the glass, the $Te^{4+}$ content is desirably 0 to 4%. However, considering the impact on the environment, the $Te^{4+}$ content is desirably minimized. The content range is desirably 0 to 2%, preferably 0 to 1%. It is possible not to incorporate $Te^{4+}$.

$Li^+$ is a component that is effective for improving melting property, lowering the melting temperature, and lowering the temperature at which the glass exhibits the viscosity of 1.0 dPa·s. It also serves to shorten the wavelength at the absorption end of the spectral transmittance characteristics, inhibit reduction of the above components that raise the refractive index in the glass melt, and inhibit coloration. However, when the $Li^+$ content is excessive, the refractive index decreases and thermal stability tends to diminish. Thus, the upper limit of the $Li^+$ content is desirably 4%, preferably 3%, more preferably 2%, and still more preferably, 1%. The lower limit of the $Li^+$ content is desirably 0%, preferably 0.1%. When emphasizing the stability of the glass, it is possible not to incorporate $Li^+$.

$Na^+$ serves to improve the melting property without greatly compromising the thermal stability of the glass, lower the melting temperature, shorten the wavelength of the absorbance end of the spectral transmittance characteristics, inhibit reduction of the above components that raise the refractive index in the glass melt, and inhibit coloration. It also serves to lower the liquidus temperature. However, when the $Na^+$ content is excessive, the refractive index drops and thermal stability tends to decrease. To enhance the melting property and thermal stability of the glass while maintaining a high refractive index characteristic, the $Na^+$ content is desirably kept to 0 to 15%. The upper limit of the $Na^+$ content is desirably, in increasing order of preference, 13%, 10%, 8%, and 6%. Since the ion radius of $Na^+$ lies between those of $Li^+$ and $K^+$, it serves to lower the refractive index more than $Li^+$ and less than $K^+$. The lower limit of the $Na^+$ content is desirably 0%, preferably 0.5%, more preferably 1.0%, still more preferably 1.5%, and yet still more preferably, 2.0%.

$K^+$ also serves to enhance the melting property and lower the melting temperature. It further serves to shorten the wavelength of the absorption end of the spectral transmittance characteristic, inhibit reduction of the above components that raise the refractive index in the glass melt, and inhibit coloration. It serves to enhance thermal stability and lower the liquidus temperature more than $Li^+$ and $Na^+$. However, when the $K^+$ content is excessive, the refractive index drops and the thermal stability tends to decrease. Thus, the $K^+$ content is desirably 0 to 15%. The upper limit of the $K^+$ content is preferably 13%, more preferably 10%, still more preferably 8%, and yet still more preferably, 6%.

$Rb^+$ also serves to improve the melting property. It can be incorporated into the glass as an optional component. However, it is more expensive than other alkali metal components. Thus, the $Rb^+$ content is desirably kept to 0 to 2%, preferably 0 to 1%, and more preferably, to 0 to 0.5%.

$Cs^+$ stabilizes the glass when incorporated in small quantities, and can thus be incorporated into the glass as an optional component. However, it is more expensive than other alkali metals components. Thus, the $Cs^+$ content is desirably 0 to 5%, preferably 0 to 3%, more preferably 0 to 2%, and still more preferably, 0 to 1%.

It is also possible to not incorporate $Rb^+$ or $Cs^+$.

To improve the melting property and inhibit erosion of platinum, gold, and the like, the combined content of $Li^+$, $Na^+$, and $K^+$ is desirably greater than 0%, preferably equal to or more than 0.2%, more preferably equal to or more than 0.5%, still more preferably equal to or more than 1.0%, yet more preferably equal to or more than 1.5%, yet still more preferably equal to or more than 2.0%, and even more preferably, equal to or more than 2.5%. Incorporating the above alkali metal components is desirable to inhibit coloration of the glass due to reduction of components that raise the refractive index.

To maintain a high refractive index characteristic and thermal stability of the glass, the combined content of $Li^+$, $Na^+$, and $K^+$ is desirably equal to or less than 15%, preferably equal to or less than 12%, more preferably equal to or less than 10%, still more preferably equal to or less than 8%, yet more preferably equal to or less than 6%, yet still more preferably equal to or less than 5%, and even more preferably, equal to or less than 4%.

When incorporated in small quantity, $B^{3+}$ serves to improve the thermal stability and melting property of the glass, raise the viscosity, and lower the liquidus temperature.

However, the viscosity raising effect of $B^{3+}$ tends to raise the temperature at which the glass can be refined. As a result, the degree of coloration of the glass that is manufactured tends to deteriorate. When the content is excessive, the refractive index drops, the thermal stability decreases during reheating of the glass, the liquidus temperature rises, and coloration of the glass due to reduction of components that raise the refractive index tends to be promoted. Thus, $B^{3+}$ is a component the content of which is desirably minimized in the present invention. That is, the $B^{3+}$ content is desirably kept to 0 to 8%. The upper limit of the $B^{3+}$ content is desirably 6%, preferably 4%, more preferably 2%, and still more preferably, 1%. The lower limit of the $B^{3+}$ content is desirably equal to or more than 0%. From the perspective of lowering the refining viscosity, it is desirable not to incorporate $B^{3+}$.

Each of $Mg^{2+}$, $Ca^{2+}$, $Sr^{2+}$, $Ba^{2+}$, and $Zn^{2+}$ serves to enhance the melting property of the glass. However, when the content of the components $Mg^{2+}$, $Ca^{2+}$, $Sr^{2+}$, $Ba^{2+}$, and $Zn^{2+}$ is increased, the refractive index tends to drop. Thus, the $Mg^{2+}$ content is desirably kept within a range of 0 to 4%, preferably within a range of 0 to 2%, and more preferably within a range of 0 to 1%. The $Ca^{2+}$ content is desirably kept to within a range of 0 to 4%, preferably to within a range of 0 to 2%, and more preferably, to within a range of 0 to 1%. The $Sr^{2+}$ content is desirably kept within a range of 0 to 4%, preferably within a range of 0 to 2%, and more preferably within a range of 0 to 1%. The $Zn^{2+}$ content is desirably kept within a range of 0 to 4%, preferably within a range of 0 to 2%, and more preferably within a range of 0 to 1%.

It is also possible not to incorporate $Mg^{2+}$, $Ca^{2+}$, $Sr^{2+}$, $Ba^{2+}$, and $Zn^{2+}$.

$Ba^{2+}$ serves to enhance the stability of the glass, improve the melting property, shorten the wavelength of the absorption end of the spectral transmittance characteristic, and inhibit coloration of the glass due to reduction of components that raise the refractive index. However, although it does not do so to the degree of $Mg^{2+}$, $Ca^{2+}$, $Sr^{2+}$, and $Zn^{2+}$, from the perspective of maintaining a high refractive index characteristic, the content thereof is desirably not excessive. From this perspective, the $Ba^{2+}$ content is desirably kept to within a range of 0 to 10%. The upper limit of the $Ba^{2+}$ content is preferably 8%, more preferably 7%, still more preferably 6%, and yet still more preferably, 5%. The lower limit of the $Ba^{2+}$ content is desirably 0%, preferably 1%, more preferably 2%, still more preferably 3%, and yet more preferably, 4%. From the perspective of optical characteristics, it is possible not to incorporate $Ba^{2+}$.

$Si^{4+}$ is a component that lowers the refractive index. The incorporation of an excessive quantity raises the liquidus temperature of the glass or invites phase separation of the glass. Thus, the $Si^{3+}$ content is desirably 0 to 4%, preferably 0 to 2%, and more preferably, 0 to 1%. The method of incorporating $Si^{4+}$ is normally mainly by means of an oxide starting material. However, it can also be mixed in from a crucible (made of quartz) that has been fashioned from a material comprised primarily of $SiO_2$.

$Al^{3+}$ serves to lower the refractive index and raise the liquidus temperature of the glass. Thus, the $Al^{3+}$ content is desirably kept to within a range of 0 to 3%, preferably within a range of 0 to 1%. It is also possible not to incorporate $Al^{3+}$.

To maintain the melting property and thermal stability of the glass while maintaining a refractive index exceeding 2.02, the combined content of $P^{5+}$, $Bi^{3+}$, $Nb^{5+}$, $W^{6+}$, $Li^+$, $Na^+$, $K^+$, $B^{3+}$, $Si^{4+}$, and $Ba^{2+}$ is desirably kept to 90 to 100%, preferably to 95 to 100%, more preferably to 98 to 100%, and still more preferably to 99 to 100%. The above combined content can be 100%.

Refining agents can also be added to optical glass A. $Sb_2O_3$ is a desirable refining agent. When employing $Sb_2O_3$, the quantity of $Sb_2O_3$ that is added as a weight ratio relative to the whole other than $Sb_2O_3$ is desirably kept to within a range of 0 to 10,000 ppm. The term "quantity added as a weight ratio relative to the whole other than $Sb_2O_3$" is the quantity added as a ratio based on the weight of the glass components. In addition to having a refining effect, $Sb_2O_3$ also serves to put the above components that raise the refractive index in the glass melt in an oxidized state, and to stabilize this oxidized state. However, when the quantity added as a ratio to the whole other than $Sb_2O_3$ exceeds 10,000 ppm, light absorption by Sb itself causes the glass to tend to develop coloration. From the perspective of improving the transmittance characteristics of the glass, the upper limit of the quantity of $Sb_2O_3$ that is added as a ratio to the whole other than $Sb_2O_3$ is desirably 5,000 ppm, preferably 2,000 ppm, more preferably 1,100 ppm, still more preferably 900 ppm, yet more preferably 600 ppm, and yet still more preferably, 400 ppm. The lower limit is desirably 0 ppm, preferably 50 ppm, more preferably 100 ppm, still more preferably 150 ppm, and yet more preferably, 200 ppm. Since Sb is an additive, in the present specification, the quantity added is indicated as a value that has been converted to an oxide, in contrast to the glass components.

In optical glass A, cations of Pb, As, Cd, Tl, and Se are desirably neither contained nor added out of concern for the burden placed on the environment. Cations of V, Cr, Mn, Fe, Co, Ni, Cu, Pr, Nd, Eu, Tb, Ho, and Er all impart color to the glass or generate fluorescence when irradiated with ultraviolet radiation. Thus, they are desirably neither contained nor added. However, their being neither contained nor added does not exclude their being mixed in as impurities derived from glass starting materials or the glass melting step.

$Ga^{3+}$, $La^{3+}$, $Gd^{3+}$, $Y^{3+}$, $Yb^{3+}$, $Lu^{3+}$, $In^{3+}$, $Ge^{4+}$, and $Hf^{4+}$ can each be incorporated in small quantities. Since no significant effects are achieved by these components and they are all expensive, the content of each is desirably kept to within a range of 0 to 2%, preferably within a range of 0 to 1%, more preferably within a range of equal to or more than 0% but less than 0.5%, and still more preferably from equal to or more than 0% but less than 0.1%. To keep down the cost of manufacturing the glass, they are desirably not incorporated.

[Refractive Index and Abbé Number]

The glass characteristics of optical glass A will be described in detail next.

The refractive index nd of optical glass A is equal to or higher than 2.02. An optical glass with such an extremely high refractive index is suitable as a material for optical elements that constitute compact optical systems with high zoom ratios and wide angles. The upper limit of the refractive index nd is naturally established by the range of the glass composition given above; 3.0 can be considered as a yardstick.

From the perspective of providing optical glass that can be used in optical elements that are effective for achieving highly functional and compact optical systems, the lower limit of the refractive index nd is desirably 2.03, preferably 2.05, and more preferably, 2.07.

To maintain the melting property and thermal stability of the glass, the upper limit of the refractive index nd is desirably 2.3, preferably 2.2, more preferably 2.18, and still more preferably, 2.16.

To correct chromatic aberration in combination with optical elements made of low-dispersion glass, the upper limit of the Abbé number vd is desirably 18.0, preferably 17.8, more preferably 17.6, still more preferably 17.4, yet more preferably 17.2, and yet still more preferably, 17.1.

The lower limit of the Abbé number vd is determined naturally from the ranges of the glass components given above. To maintaining the melting property and thermal stability of the glass, the lower limit of the Abbé number vd is desirably 14, preferably 15, and more preferably, 16.

To obtain glass that is suited to correcting chromatic aberration, ranges satisfying equation (1) are desirable as the ranges of the refractive index nd and the Abbé number vd, ranges satisfying equation (2) below are preferred, ranges satisfying equation (3) below are of greater preference, ranges satisfying equation (4) below are of still greater preference, and ranges satisfying equation (5) below are of yet greater preference.

$$vd < 39.00 - 10 \times nd \quad (1)$$

$$vd < 38.80 - 10 \times nd \quad (2)$$

$$vd < 38.60 - 10 \times nd \quad (3)$$

$$vd < 38.40 - 10 \times nd \quad (4)$$

$$vd < 38.20 - 10 \times nd \quad (5)$$

[Viscosity Characteristics]

For reasons given further below, optical glass A desirably has the viscosity characteristics described in detail below for optical glass B.

[Liquidus Temperature]

The liquidus temperature tends to rise with the increase of the refractive index and dispersion of the glass. When the liquidus temperature rises, the melting temperature and molding temperature are raised to prevent devitrification during manufacturing of the glass. The liquidus temperature of optical glass A desirably falls within a range of equal to or lower than 1,100° C. Keeping the liquidus temperature within the above range can inhibit an excessive rise in the melting temperature and molding temperature. To prevent the platinum and gold materials of melting vessels from dissolving into the glass during manufacturing of the glass and discoloring the glass, and to prevent platinum and gold from mixing in as foreign materials that compromise the quality of the glass, it is desirable to keep the liquidus temperature within the above range. The upper limit of the liquidus temperature is preferably 1,050° C., more preferably 1,000° C., still more preferably 980° C., yet more preferably 960° C., yet still more preferably 950° C., even more preferably 940° C., still even more preferably 930° C., and yet even more preferably, 920° C.

From the perspective of containing more components with high melting points that raise the refractive index, a liquidus temperature of equal to or higher than 800° C., preferably equal to or higher than 850° C., can be considered as a yardstick for the lower limit of the liquidus temperature.

The viscosity of the glass at the liquidus temperature is desirably equal to or higher than 1.0 dP·s, preferably equal to or higher than 1.5 dP·s, more preferably equal to or higher than 2.0 dP·s, still more preferably equal to or higher than 2.5 dP·s, yet more preferably equal to or higher than 3.0 dP·s, and yet still more preferably, equal to or higher than 3.5 dP·s.

The upper limit of the viscosity of the glass at the liquidus temperature is not specifically limited. However, to improve the optical characteristics and the like of the glass, equal to or lower than 100 dP·s is desirable, equal to or lower than 30 dP·s is preferred, and equal to or lower than 20 dP·s is of greater preference.

[Degree of Coloration]

Generally, indicators based on specific wavelengths in the form of the λ70, which is the wavelength exhibiting an external transmittance of 70%, and the λ5, which is the wavelength exhibiting an external transmittance of 5%, are employed as indicators of the extent to which short wavelengths of light are passed among the spectral transmittance characteristics of an optical glass.

The λ70 is the wavelength at which light ray transmittance becomes 70% in the wavelength range of 280 to 700 nm. In this context, the term "light ray transmittance" is the spectral transmittance obtained by directing light in a direction perpendicular to a polished surface of a glass sample 10.0±0.1 mm in thickness having mutually parallel polished surfaces. That is, it is Iout/Iin, where the intensity of the light entering the sample is denoted as Iin and the intensity of the light that has passed through the sample is denoted as Iout. The spectral transmittance includes the reflection loss of light at the sample surfaces. "Polishing" means smoothing to a state of adequately low surface roughness relative to the wavelengths of the measured wavelength range. The λ5 is the wavelength at which the light ray transmittance as measured by the above method employed for λ70 becomes 5%.

Conventional high refractive index glass as set forth above will tend to develop color during melting and refining. However, in a desirable embodiment of optical glass A, it is possible to achieve a λ70 of equal to or lower than 550 nm while having a refractive index nd of equal to or higher than 2.02. The range of λ70 is preferably equal to or lower than 520 nm, more preferably equal to or lower than 500 nm, still more preferably equal to or lower than 490 nm, yet more preferably equal to or lower than 480 nm, yet still more preferably equal to or lower than 470 nm, and even more preferably, equal to or lower than 460 nm. The lower limit of the λ70 is not specifically limited. However, 380 nm can be considered as a yardstick for the lower limit of λ70.

The range of λ5 is desirably equal to or lower than 450 nm, preferably equal to or lower than 430 nm, more preferably equal to or lower than 410 nm, still more preferably equal to or lower than 400 nm, yet more preferably equal to or lower than 395 nm, and yet still more preferably, equal to or lower than 390 nm. The lower limit of the λ5 is not specifically limited. However, 300 nm can be considered as a yardstick for the lower limit of λ5.

An aspect of the present invention can provide optical glass in which not only is there little coloration, but mixing in due to the ionization of metal materials constituting the melting vessel, such as platinum and gold, and mixing in as metal particles, are extremely low.

[Specific Gravity]

In the present specification, the specific gravity is defined as the specific gravity of glass obtained at a gradual cooling rate of −30° C./hour. The upper limit of the specific gravity of optical glass A is desirably 6.5, preferably 5.9, more preferably 5.8, still more preferably 5.7, and yet more preferably, 5.65. The desirable lower limit is not specifically limited. However, when the specific gravity is lowered excessively, the phenomena such as a drop in the refractive index may become present. The lower limit of the specific gravity is thus desirably 3.0, preferably 4.0, more preferably 4.5, still more preferably 4.8, and yet more preferably, 5.0.

Optical Glass B

Optical glass B is optical glass, which has a refractive index nd of equal to or higher than 2.02 and a temperature at which viscosity becomes 1.0 dPa·s of equal to or lower than 1,100° C.

Optical glass B will be described in detail below.

To promote bubble removal during refining, the refining temperature of the glass melt is desirably roughly the temperature at which the glass exhibits the viscosity of 1.0 dP·s. Among the processes conducted in a metal melting vessel, the temperature of the glass is highest during refining. Thus, by keeping the temperature at which the glass exhibits the viscosity of 1.0 dP·s to equal to or lower than 1,100° C., it becomes possible to conduct the glass melting step at equal to or lower than 1,100° C. while maintaining an adequate refining property. As a result, the metal melting vessel of platinum, gold, or the like tends not to be eroded by the glass melt, an increase in coloration of the glass due to the dissolving of platinum ions, gold ions, or the like tends to be inhibited, and an increase in coloration due to reduction of components raising the refractive index tends to be suppressed. It is thus possible to obtain optical glass with little coloration, that is optically homogeneous, and from which bubbles have been adequately removed. Inhibiting a rise in the refining temperature can inhibit volatilization from the glass melt and inhibit changes in composition and variation in optical characteristics due to volatilization.

The range of the temperature at which the glass exhibits the viscosity of 1.0 dP·s in a glass melt state is desirably equal to or lower than 1,080° C., preferably equal to or lower than 1,060° C., more preferably equal to or lower than 1,050° C., more preferably equal to or lower than 1,040° C., still more preferably equal to or lower than 1,030° C., and yet more preferably, equal to or lower than 1,020° C. One can think of 800° C. as a yardstick for the lower limit of the temperature at which the glass exhibits the viscosity of 1.0 dP·s.

Several desirable embodiments of optical glass B will be described next. Any combination of these embodiments is possible.

The first desirable embodiment is optical glass with the viscosity at the liquidus temperature of equal to or higher than 1.0 dP·s. By having the viscosity at the liquidus temperature of equal to or higher than 1.0 dP·s, molding of the glass can be facilitated while preventing crystallization during manufacturing of the glass.

Having the glass viscosity at the liquidus temperature of equal to or higher than 1.5 dP·s is preferred, equal to or higher than 2.0 dP·s is of greater preference, equal to or higher than 2.5 dP·s is of still greater preference, equal to or higher than 3.0 dP·s is of yet greater preference, and equal to or higher than 3.5 dP·s is of yet still greater preference.

The upper limit of the viscosity of the glass at the liquidus temperature is not specifically limited. However, in terms of improving the optical characteristics and the like of the glass, equal to or lower than 100 dP·s is desirable, equal to or lower than 30 dP·s is preferred, and equal to or lower than 20 dP·s is of greater preference.

The second desirable embodiment is optical glass with a liquidus temperature of equal to or lower than 1,100° C. Having a liquidus temperature of equal to or lower than 1,100° C. can more reliably prevent devitrification of the glass while improving the molding property of the glass, inhibiting the introduction of foreign material, and reducing coloration of the glass. The upper limit of the liquidus temperature is desirably 1,050° C., preferably 1,000° C., more preferably 980° C., still more preferably 960° C., yet more preferably 950° C., yet still more preferably 940° C., even more preferably 930° C., and optimally, 920° C.

The third desirable embodiment is optical glass in which the refractive index nd and the Abbé number vd satisfy above relational equation (1), desirably satisfy relational equation (2), preferably satisfy relational equation (3), more preferably satisfy relational equation (4), and still more preferably satisfy relation equation (5).

The optical glass that satisfies the above relational equation is glass of extremely high refractive index and dispersion in the form of a material that is suited to raising the zoom ratio, widening the angle, and increasing the compactness of optical elements. For the upper limit of the refractive index nd, 3.0 can be thought of as a yardstick.

From the perspective of providing optical glass that can be used as an optical element that more effectively increases the functionality and compactness of optical systems, the lower limit of the refractive index nd is desirably 2.03, preferably 2.05, and more preferably, 2.07.

To maintain the melting property and thermal stability of the glass, the upper limit of the refractive index nd is desirably 2.3, preferably 2.2, more preferably 2.18, and still more preferably, 2.16.

To maintain the melting property and thermal stability of the glass, the lower limit of the Abbé number vd is desirably 14, preferably 15, and more preferably, 16.

The glass composition will be described below. Optical glass B is desirably oxide glass in which $O^{2-}$ is the main anion component. For the $O^{2-}$ content, 90 to 100 anion % can be thought of as a yardstick. When the $O^{2-}$ content is within the above range, other anion components in the form of $F^-$, $Cl^-$, $Br^-$, $I^-$, $S^{2-}$, $Se^{2-}$, $N^{3-}$, $NO_3^-$, $SO_4^{2-}$ and the like can be incorporated. In this case, the combined content of $F^-$, $Cl^-$, $Br^-$, $I^-$, $S^{2-}$, $Se^{2-}$, $N^{3-}$, $NO_3^-$, and $SO_4^{2-}$ can be, for example, 0 to 10 anion %. The $O^{2-}$ content can be 100 anion %.

Below, unless specifically stated otherwise, the contents and combined contents of cation components are denoted as cation %.

The fourth desirable embodiment is optical glass containing equal to or more than 10 cation % of $P^{5+}$ as a glass component. Having a $P^{5+}$ content of equal to or more than 10 cation % can improve the thermal stability and melting property of the glass.

$P^{5+}$ is a glass network-forming component and a component that serves to lower the liquidus temperature and inhibit a rise in the temperature at which the glass exhibits the viscosity of 1.0 dP·s. When the $P^{5+}$ content exceeds 40%, the refractive index drops and the tendency of the glass to crystallize increases. Thus, the $P^{5+}$ content is desirably equal to or less than 40%. The lower limit of the $P^{5+}$ content is preferably 12% and, in increasing order of preference, 14%, 16%, 18%, 20%, 22%, 24%, and 26%. The upper limit of the $P^{5+}$ content is preferably 38% and, in increasing order of preference, 35%, 33%, 31%, 30%, 29%, and 28%.

The fifth desirable embodiment is optical glass comprising equal to or more than 50% of $Ti^{4+}$, $Nb^{5+}$, $Bi^{3+}$, $W^{6+}$, and $Te^{4+}$ combined as glass components.

Each of $Ti^{4+}$, $Nb^{5+}$, $W^{6+}$, $Bi^{3+}$, and $Te^{4+}$ serves to raise the refractive index. To achieve a refractive index nd of equal to or higher than 2.02, the combined content of $Ti^{4+}$, $NW^+$, $W^{6+}$, $Bi^{3+}$, and $Te^{4+}$ is desirably equal to or more than 50%. To achieve glass with a higher refractive index, the lower limit of the combined content of $Ti^{4+}$, $Nb^{5+}$, $W^{6+}$, $Bi^{3+}$, and $Te^{4+}$ is preferably 55%, and in increasing order of preference, 56%, 57%, 58%, 59%, and 60%. When the combined content of $Ti^{4+}$, $Nb^{5+}$, $W^{6+}$, $Bi^{3+}$, and $Te^{4+}$ becomes excessive, the thermal stability of the glass decreases. Thus, the upper limit of the combined content of $Ti^{4+}$, $Nb^{5+}$, $W^{6+}$, $Bi^{3+}$, and $Te^{4+}$ is desirably 75% and, in increasing order of preference, 72%, 70%, 68%, and 66%.

Among $Ti^{4+}$, $Nb^{5+}$, $W^{6+}$, and $Bi^{3+}$, the components yielding advantageous effects in terms of lowering the temperature at which the glass melt exhibits the viscosity of 1.0 dP·s are $W^{6+}$ and $Bi^{3+}$. Accordingly, in the present invention, to inhibit a rise in the temperature at which the glass melt exhibits the viscosity of 1.0 dP·s, the ratio of the combined content of $Ti^{4+}$ and $Nb^{5+}$ to the combined content of $W^{6+}$ and $Bi^{3+}$, $(Ti^{4+}+Nb^{5+})/(W^{6+} Bi^{3+})$, is desirably kept to equal to or less than 1.3. To inhibit a rise in the refining temperature and inhibit an increase in glass coloration, the cation ratio of $((Ti^{4+}+Nb^{5+})/(W^{6+}+Bi^{3+}))$ is preferably kept to within a range of equal to or less than 1.2 and, in increasing order of preference as the upper limit thereof, to 1.15, 1.10, 1.05, 1.00, and 0.90.

As set forth above, $Ti^{4+}$, $Nb^{5+}$, $W^{6+}$, $Bi^{3+}$, and $Te^{4+}$ affect the melting property differently. However, when present together, the overall tendency is one of deterioration of the melting property of the glass, such that if one component vitrifies, the remaining components remain unmelted in the glass, or when an attempt is made to vitrify all of the components, other components compromise coloration of the glass.

$B^{3+}$, $Li^+$, $Na^+$, $K^+$, $Rb^+$, $Cs^+$, $Mg^{2+}$, $Ca^{2+}$, $Sr^{2+}$, $Ba^{2+}$, and $Zn^{2+}$ serve to improve the melting property of the glass.

In the sixth desirable embodiment, the upper limit of the combined content of $B^{3+}$, $Li^+$, $Na^+$, $K^+$, $Rb^+$, $Cs^+$, $Mg^{2+}$, $Ca^{2+}$, $Sr^{2+}$, $Ba^{2+}$, and $Zn^{2+}$ is specified as a ratio to the combined content of $Ti^{4+}$, $Nb^{5+}$, $W^{6+}$, $Bi^{3+}$, and $Te^{4+}$ to maintain a high refractive index characteristic. That is, the sixth desirable embodiment is optical glass in which the combined content of $B^{3+}$, $Li^+$, $Na^+$, $K^+$, $Rb^+$, $Cs^+$, $Mg^{2+}$, $Ca^{2+}$, $Sr^{2+}$, $Ba^{2+}$, and $Zn^{2+}$ is equal to or less than ⅓ of the combined content of $Ti^{4+}$, $Nb^{5+}$, $W^{6+}$, $Bi^{3+}$, and $Te^{4+}$.

The upper limit of the cation ratio of the combined content of $B^{3+}$, $Li^+$, $Na^+$, $K^+$, $Rb^+$, $Cs^+$, $Mg^{2+}$, $Ca^{2+}$, $Sr^{2+}$, $Ba^{2+}$, and $Zn^{2+}$ to the combined content of $Ti^{4+}$, $Nb^{5+}$, $W^{6+}$, $Bi^{3+}$, and $Te^{4+}((B^{3+}+Li^++Na^++K^++Rb^++Cs^++Mg^{2+}+Ca^{2+}+Sr^{2+}+Ba^{2+}+Zn^{2+})/(Ti^{4+}+Nb^{5+}+W^{6+}+Bi^{3+}+Te^{4+}))$ is desirably 3/10, preferably ¼, and more preferably 9/40. The lower limit is desirably 4/30, preferably 3/20, more preferably ⅙.

The seventh desirable embodiment is optical glass containing more than 0% of $Li^+$, $Na^+$, $K^+$, $Rb^+$ and $Cs^+$ combined, which effectively improve melting property.

Because optical glass with a refractive index nd of equal to or higher than 2.02 and good melting property is obtained, the embodiment in which the sixth desirable embodiment and the seventh desirable embodiment are combined is a preferred embodiment.

A description common to the fourth through seventh desirable embodiments will be given below.

$Ti^{4+}$ is a component that serves to raise the refractive index and increase dispersion of the glass. It is an optional component that serves to maintain the thermal stability of the glass when present with $Bi^{3+}$ and $Nb^{5+}$. Accordingly, the content thereof can be 0%. It serves to raise the chemical durability of the glass and raise the mechanical strength of the glass. When the $Ti^{4+}$ content exceeds 15%, the thermal stability decreases, the tendency to crystallize increases, the melting property deteriorates, and the liquidus temperature rises markedly. Further, the absorption end of the spectral transmittance characteristic tends to exhibit a longer wavelength, and the glass tends to develop a bister coloration.

Accordingly, the $Ti^{4+}$ content is desirably kept to 0 to 15%. The upper limit of the $Ti^{4+}$ content is desirably 14%, preferably 13%, more preferably 12%, still more preferably 11%, and yet still more preferably, 10%. The lower limit of the $Ti^{4+}$ content is desirably 2%, preferably 3%, more preferably 4%, still more preferably 5%, and yet still more preferably, 6%, 7%, and 8%.

$Nb^{5+}$ is a component that serves to raise the refractive index and increase dispersion of the glass. It is an optional component that serves to maintain the thermal stability of the glass in the presence of $Bi^{3+}$ and $Ti^{4+}$. It also serves to enhance the chemical durability of the glass and increase the mechanical strength of the glass. To achieve a desired high refractive index and high dispersion characteristics while maintaining thermal stability, the $Nb^{5+}$ content is desirably equal to or more than 10%, preferably equal to or more than 12%, and more preferably, equal to or more than 13%, equal to or more than 14%, and equal to or more than 15%. When the $Nb^{5+}$ content is excessive, the thermal stability of the glass decreases, the liquidus temperature rises markedly, and the absorption end of the spectral transmittance characteristics tends to exhibit a somewhat longer wavelength. Accordingly, the $Nb^{5+}$ content is desirably equal to or less than 24% and, in increasing order of preference as the upper limit thereof, 23%, 22%, 21%, 20%, and 19%.

$W^{6+}$ is an optional component that serves to raise the refractive index and increase the dispersion of the glass, enhance the chemical durability of the glass, and increase the mechanical strength of the glass. Accordingly, the content thereof can be 0%. When the $W^{6+}$ content is excessive, the thermal stability of the glass decreases, the liquidus temperature tends to rise, the glass exhibits a bluish-gray coloration, and the absorption end of the spectral transmittance characteristic tends to exhibit a longer wavelength. Accordingly, the $W^{6+}$ content is desirably kept to equal to or less than 19%. The upper limit of the $W^{6+}$ content is preferably 18% and, in increasing order of preference, 17%, 16%, 15%, 14%, 13%, and 12%.

$Bi^{3+}$ is a component that raises the refractive index and increases dispersion. The incorporation of a suitable quantity serves to improve the thermal stability of the glass. When the $Bi^{3+}$ content is excessive, thermal stability decreases, the liquidus temperature rises, the glass exhibits a bister coloration, and the absorption end of the spectral transmittance characteristic tends to exhibit a longer wavelength. Accordingly, the upper limit of the $Bi^{3+}$ content is desirably kept to equal to or less than 33%, in increasing order of preference, to 32%, 31%, 30%, 29%, and 28%. The lower limit of the $Bi^{3+}$ content is desirably 16% and, in increasing order of preference, 17%, 18%, 19%, and 20%.

$Te^{4+}$ serves to raise the refractive index and increase the dispersion of the glass, and to enhance the thermal stability of the glass. Taking into account the thermal stability of the glass, the $Te^{4+}$ content is desirably 0 to 4%. However, considering the impact on the environment, the $Te^{4+}$ content is desirably minimized. The content range is preferably 0 to 2%, preferably 0 to 1%. It is possible not to incorporate $Te^{4+}$.

$Li^+$ is a component that is effective for improving the melting property, lowering the melting temperature, and lowering the temperature at which the glass exhibits the viscosity of 1.0 dPa·s. It also serves to shorten the wavelength at the absorption end of the spectral transmittance characteristics, inhibit reduction of the above components that raise the refractive index in the glass melt, and inhibit coloration. However, when the $Li^+$ content is excessive, the refractive index decreases and thermal stability tends to diminish. Thus, the upper limit of the $Li^+$ content is desirably 4%, preferably 3%, more preferably 2%, and still more preferably, 1%. The lower limit of the $Li^+$ content is desirably 0%, preferably 0.1%. When emphasizing the stability of the glass, it is possible not to incorporate $Li^+$.

$Na^+$ serves to improve the melting property without greatly compromising the thermal stability of the glass, lower the melting temperature, shorten the wavelength of the absorbance end of the spectral transmittance characteristics, inhibit reduction of the above components that raise the refractive index in the glass melt, and inhibit coloration. It also serves to lower the liquidus temperature. However, when the $Na^+$ content is excessive, the refractive index drops and thermal stability tends to decrease. To enhance the melting property and thermal stability of the glass while maintaining a high refractive index characteristic, the $Na^+$ content is desirably kept to 0 to 15%. The upper limit of the $Na^+$ content is desirably, in increasing order of preference, 13%, 10%, 8%, and 6%. Since the ion radius of $Na^+$ lies between those of $Li^+$ and $K^+$, it serves to lower the refractive index more than $Li^+$ and less than $K^+$. The lower limit of the $Na^+$ content is desirably 0%, preferably 0.5%, more preferably 1.0%, still more preferably 1.5%, and yet still more preferably, 2.0%.

$K^+$ also serves to enhance the melting property and lower the melting temperature. It further serves to shorten the wavelength of the absorption end of the spectral transmittance characteristic, inhibit reduction of the above components that raise the refractive index in the glass melt, and inhibit coloration. It serves to enhance thermal stability and lower the liquidus temperature more than $Li^+$ and Nat However, when the $K^+$ content is excessive, the refractive index drops and the thermal stability tends to decrease. Thus, the $K^+$ content is desirably 0 to 15%. The upper limit of the $K^+$ content is preferably 13%, more preferably 10%, still more preferably 8%, and yet still more preferably, 6%.

$Rb^+$ also serves to improve the melting property. It can be incorporated into the glass as an optional component. However, it is more expensive than other alkali metal components. Thus, the $Rb^+$ content is desirably kept to 0 to 2%, preferably 0 to 1%, and more preferably, to 0 to 0.5%.

$Cs^+$ stabilizes the glass when incorporated in small quantities, and can thus be incorporated into the glass as an optional component. However, it is more expensive than other alkali metal components. Thus, the $Cs^+$ content is desirably 0 to 5%, preferably 0 to 3%, more preferably 0 to 2%, and still more preferably, 0 to 1%.

It is also possible to not incorporate $Rb^+$ or $Cs^+$.

To improve the melting property and inhibit erosion of platinum, gold, and the like, the combined content of $Li^+$, $Na^+$, and $K^+$ is desirably greater than 0%, preferably equal to or more than 0.2%, more preferably equal to or more than 0.5%, still more preferably equal to or more than 1.0%, yet more preferably equal to or more than 1.5%, yet still more preferably equal to or more than 2.0%, and even more preferably, equal to or more than 2.5%. Incorporating the above alkali metal components is desirable to inhibit coloration of the glass due to reduction of components that raise the refractive index.

To maintain a high refractive index characteristic and thermal stability of the glass, the combined content of $Li^+$, $Na^+$, and $K^+$ is desirably equal to or less than 15%, preferably equal to or less than 12%, more preferably equal to or less than 10%, still more preferably equal to or less than 8%, yet more preferably equal to or less than 6%, yet still more preferably equal to or less than 5%, and even more preferably, equal to or less than 4%.

When incorporated in small quantity, $B^{3+}$ serves to improve the thermal stability and melting property of the glass, raise the viscosity, and lower the liquidus temperature. However, the viscosity raising effect of $B^{3+}$ tends to raise the temperature at which the glass can be refined. As a result, the degree of coloration of the glass that is manufactured tends to deteriorate. When the content is excessive, the refractive index drops, the thermal stability decreases during reheating of the glass, the liquidus temperature rises, and coloration of the glass due to reduction of components that raise the refractive index tends to be promoted. Thus, $B^{3+}$ is a component the content of which is desirably minimized in the present invention. That is, the $B^{3+}$ content is desirably kept to 0 to 8%. The upper limit of the $B^{3+}$ content is preferably 6%, more preferably 4%, still more preferably 2%, and yet more preferably, 1%. The lower limit of the $B^{3+}$ content is desirably equal to or more than 0%. From the perspective of lowering the refining viscosity, it is desirable not to incorporate $B^{3+}$.

Each of $Mg^{2+}$, $Ca^{2+}$, $Sr^{2+}$, $Ba^{2+}$, and $Zn^{2+}$ serves to enhance the melting property of the glass. However, when the content of the components $Mg^{2+}$, $Ca^{2+}$, $Sr^{2+}$, $Ba^{2+}$, and $Zn^{2+}$ is increased, the refractive index tends to drop. Thus, the $Mg^{2+}$ content is desirably kept within a range of 0 to 4%, preferably within a range of 0 to 2%, and more preferably within a range of 0 to 1%. The $Ca^{2+}$ content is desirably kept to within a range of 0 to 4%, preferably to within a range of 0 to 2%, and more preferably, to within a range of 0 to 1%. The $Sr^{2+}$ content is desirably kept within a range of 0 to 4%, preferably within a range of 0 to 2%, and more preferably within a range of 0 to 1%. The $Zn^{2+}$ content is desirably kept within a range of 0 to 4%, preferably within a range of 0 to 2%, and more preferably within a range of 0 to 1%.

It is also possible not to incorporate $Mg^{2+}$, $Ca^{2+}$, $Sr^{2+}$, $Ba^{2+}$, or $Zn^{2+}$.

$Ba^{2+}$ serves to enhance the stability of the glass, improve the melting property, shorten the wavelength of the absorption end of the spectral transmittance characteristic, and inhibit coloration of the glass due to reduction of components that raise the refractive index. However, although it does not do so to the degree of $Mg^{2+}$, $Ca^{2+}$, $Sr^{2+}$, and $Zn^{2+}$, from the perspective of maintaining a high refractive index characteristic, the content thereof is desirably not excessive. From this perspective, the $Ba^{2+}$ content is desirably kept to within a range of 0 to 10%. The upper limit of the $Ba^{2+}$ content is preferably 8%, more preferably 7%, still more preferably 6%, and yet still more preferably, 5%. The lower limit of the $Ba^{2+}$ content is desirably 0%, preferably 1%, more preferably 2%, still more preferably 3%, and yet more preferably, 4%. From the perspective of optical characteristics, it is possible not to incorporate $Ba^{2+}$.

$Si^{4+}$ is a component that lowers the refractive index. The incorporation of an excessive quantity raises the liquidus temperature of the glass or invites phase separation of the glass. Thus, the $Si^{4+}$ content is desirably 0 to 4%, preferably 0 to 2%, and more preferably, 0 to 1%. The method of incorporating $Si^{4+}$ is normally mainly by means of an oxide starting material. However, it can also be mixed in from a crucible (made of quartz) that has been fashioned from a material comprised primarily of $SiO_2$.

$Al^{3+}$ serves to lower the refractive index and raise the liquidus temperature of the glass. Thus, the $Al^{3+}$ content is desirably kept to within a range of 0 to 3%, preferably within a range of 0 to 1%. It is also possible not to incorporate $Al^{3+}$.

To maintain the melting property and thermal stability of the glass while maintaining a refractive index exceeding 2.02, the combined content of $P^{5+}$, $Bi^{3+}$, $Nb^{5+}$, $Ti^{4+}$, $W^{6+}$, $Li^+$, $Na^+$, $K^+$, $B^{3+}$, $Si^{4+}$, and $Ba^{2+}$ is desirably kept to 90 to 100%, preferably to 95 to 100%, more preferably to 98 to 100%, and still more preferably to 99 to 100%. The combined content of the above components can be 100%.

Refining agents can also be added to optical glass B. For details on refining agents that can be added to glass B, reference can be made to the description set forth above for glass A.

In optical glass B, cations of Pb, As, Cd, Tl, and Se are desirably neither contained nor added out of concern for the burden placed on the environment. Cations of V, Cr, Mn, Fe, Co, Ni, Cu, Pr, Nd, Eu, Tb, Ho, and Er all impart color to the glass or generate fluorescence when irradiated with ultraviolet radiation. Thus, they are desirably neither contained nor added. However, their being neither contained nor added does not exclude their being mixed in as impurities derived from glass starting materials or the glass melting step.

$Ga^{3+}$, $La^{3+}$, $Gd^{3+}$, $Y^{3+}$, $Yb^{3+}$, $Lu^{3+}$, $In^{3+}$, $Ge^{4+}$, and $Hf^{4+}$ can each be incorporated in small quantities. Since no significant effects are achieved by these components and they are all expensive, the content of each is desirably kept to within a range of 0 to 2%, preferably within a range of 0 to 1%, more preferably within a range of equal to or more than 0% but less than 0.5%, and still more preferably from equal to or more than 0% but less than 0.1%. To keep down the cost of manufacturing the glass, they are desirably not incorporated.

[Degree of Coloration]

In a desirable embodiment of optical glass B with regard to degree of coloration, the description is as given for optical glass A above. Optical glass B can be optical glass with little coloration and with extremely little mixing in of metal particles and ions of the metal materials constituting the mixing vessel, such as platinum and gold.

[Specific Gravity]

In a desirable embodiment of optical glass B with regard to specific gravity, the description is as given for optical glass A above.

Unless specifically stated otherwise, the description relating to optical glass A given above can also be applied to optical glass B. Conversely, unless specifically stated otherwise, the description relating to optical glass B given above can also be applied to optical glass A.

[Method of Manufacturing an Optical Glass]

The method of manufacturing an optical glass according to an aspect of the present invention comprises melting glass starting materials by heating, refining the glass melt obtained, molding the glass melt that has been refined, and blending the glass starting materials so as to obtain above-described optical glass A or B of the present invention.

A specific embodiment of the method of manufacturing optical glass according to an aspect of the present invention will be given below. However, the present invention is not limited to the embodiment given below.

For example, compound starting materials corresponding to the various components are weighed out and thoroughly mixed to obtain a blended starting material that will yield the glass of desired composition. The compound starting material is charged to a crucible and melted for 0.5 to 3 hours while being stirred at 1,050 to 1,250° C. The glass melt is then caused to flow out of a prescribed vessel, cooled, and crushed to obtain cullets.

Next, the cullets that have been obtained are charged to a crucible made of noble metal such as platinum, platinum alloy, gold, or gold alloy, heated to with a range from the liquidus temperature (LT) to LT+80° C., desirably to the liquidus temperature LT to LT+50° C., stirred, and melted.

Next, the glass melt is refined for 0.5 to 3 hours at a temperature at which the glass exhibits the viscosity of 1.0 dP·s±50° C., preferably at a temperature at which the glass exhibits the viscosity of 1.0 dP.s±20° C. Following refining, the temperature of the glass is raised from the refining temperature to the liquidus temperature LT to LT+80° C., desirably to the liquidus temperature LT to LT+50° C., preferably to the liquidus temperature LT to LT+40° C., and more preferably to the liquidus temperature LT to LT+30° C. Subsequently, the glass melt is caused to flow out through a pipe connected to the bottom of the crucible, or cast into a casting mold, and molded, yielding optical glass. The temperature setting when employing a crucible made of noble metal in the form of gold is equal to or lower than 1,050° C., which is lower than the melting point of gold.

The above melting conditions and the time required by various steps can be suitably adjusted.

Multiple types of cullets of differing optical characteristics can be prepared by the above method, and these cullets can be blended, melted, refined, and molded so as to obtain desired optical characteristics in the preparation of optical glass.

Press Molding Glass Material

The press molding glass material (referred to as the "glass material", hereinafter) according to an aspect of the present invention is comprised of optical glass A or B. To obtain the above glass material, for example, glass starting materials that have been blended so as to obtain optical glass A or B are heated, melted, and molded. The molded glass article thus prepared is processed to prepare a glass material corresponding to the weight of one press-molded article. In addition to such a method, known methods of preparing press molding glass material from glass melt can be applied.

Optical Element, Method of Manufacturing Optical Element

The optical element according to an aspect of the present invention is comprised of optical glass A or B.

The method of manufacturing an optical element according to an aspect of the present invention yields an optical element by processing optical glass A or B, or preparing optical glass by the method of manufacturing an optical glass according to an aspect as set forth above, and processing the optical glass that has been prepared.

Specific examples of optical elements are lenses such as aspherical lenses, spherical lenses, plano-concave lenses, plano-convex lenses, bi-concave lenses, bi-convex lenses, convex meniscus lenses, and concave meniscus lenses; various other lenses such as microlenses, lens arrays, and lenses with diffraction gratings; prisms; and prisms with lens functions. As needed, the surface can be provided with an antireflective film, a partially antireflective film with wavelength selectivity, or the like.

Because it is comprised of optical glass having ultra-high refractive index characteristics, the above optical element can perform good correction of chromatic aberration by being combined with an optical element comprised of another optical glass. It is also effective for imparting high zoom ratios, wide angles, and compactness to imaging optical systems. Because an increase in specific gravity can be prevented by adjusting the composition while imparting an ultra-high refractive index characteristic, the weight of the optical element can also be reduced. This is also effective for preventing displacement of the focal position caused by vibration.

Further, the use of the glass in which the wavelength of the absorption end of the spectral transmittance characteristic has been shortened makes it possible to prevent the loss of image information in the visible short-wavelength region.

This is also effective for improving the color reproducing capability of digital imaging devices.

The above optical element can be applied to the imaging optical systems of digital still cameras, digital video cameras, surveillance cameras, vehicle-mounted cameras, and various other cameras; the optical elements that guide the light beams used to read and write data onto optical recording media such as DVDs and CDs; and, for example, optical pickup lenses and collimator lenses. It can also be applied as an optical element in optical communication.

Processing to obtain optical elements can be conducted by known methods such as precision press molding, grinding, and polishing. For example, optical elements can be manufactured by known methods such as the method of polishing the surface of a molded article obtained by molding the optical glass of the present invention; the method of heating and press molding the press molding glass material of the present invention to manufacture an optical element blank and grinding and polishing this optical element blank; and the method of heating and precision press molding the press molding glass material of the present invention to obtain an optical element.

EXAMPLES

The present invention will be further described through Examples below. However, the present invention is not limited to the embodiments shown in Examples.

Example 1

Compound starting materials corresponding to various components were weighed out so as to yield glasses having compositions 1 to 14 in Table 1 and thoroughly mixed to obtain blended starting materials. In the glass compositions given in Table 1, the values denoted as cation % are the bases. The anion components of the oxide glasses having the compositions of Nos. 1 to 14 were entirely $O^{2-}$.

Each of the blended starting materials was then charged to a quartz crucible and melted for 0.5 to 1.5 hours while being stirred at 1,100° C. to 1,200° C., quenched, and crushed to obtain cullets.

Next, the cullets that had been obtained were charged to a crucible made of noble metal in the form of platinum or gold, heated to the liquidus temperature LT+20° C. to LT+80° C., stirred, and melted. The glass melt was then refined over 0.5 to 3 hours at a temperature at which the glass exhibited the viscosity of 1.0 dPa·s±50° C., desirably a temperature at which the glass exhibited the viscosity of 1.0 dPa·s±20° C. Following refining, the temperature of the glass was lowered from the refining temperature to the liquidus temperature LT to LT+60° C. The glass melt was then caused to flow out through a pipe connected to the bottom of the crucible, or cast into a casting mold, and molded into glass blocks. The temperature setting when employing a crucible made of noble metal in the form of gold was equal to or lower than 1,050° C., which was lower than the melting point of gold.

When light beams were directed into the various glass blocks obtained and the optical paths of the light rays through the glass were observed from the side, no foreign material such as crystals was found in the glass. The optical glass obtained was determined to be highly homogeneous and of high quality.

The refractive index nd, Abbé number vd, liquidus temperature, temperature at which the glass exhibited the viscosity of 1.0 dPa·s, glass transition temperature, specific gravity, $\lambda 70$, and $\lambda 5$ were measured as set forth below for each of the optical glass Nos. 1 to 14 obtained.

(1) Refractive Index nd and Abbé Number vd

Measurement was conducted based on Standard JOGIS-01 of the Japan Optical Glass Manufacturers' Association.

(2) Liquidus Temperature LT and Temperature at Which Glass Exhibited the Viscosity of 1.0 dPa·s The glass sample was placed within an oven that had been heated to a prescribed temperature and maintained for two hours. Following cooling, the interior of the glass was observed by an optical microscope at 100-fold magnification to determine the liquidus temperature from the absence or presence of crystals. The viscosity was measured by a viscosity measuring method based on viscosity JIS standard Z8803 with a coaxial double-cylinder rotational viscometer, and the temperature at which the glass exhibited the viscosity of 1.0 dPa·s was determined.

(3) Glass Transition Temperature Tg

The glass transition temperature was measured with a differential scanning calorimeter DSC3300SA from the endothermic curve when the temperature of the glass in a solid state was raised. The Tg that was measured by this measurement method correlated with the Tg measured based on Standard JOGIS-08 of the Japan Optical Glass Manufacturers' Association. The measurement results are given in Table 1.

(4) Specific Gravity

The specific gravity was measured based on Standard JOGIS-05 of the Japan Optical Glass Manufacturers' Association. The measurement results are given in Table 1.

(5) $\lambda 70$, $\lambda 5$ $\lambda 70$ and $\lambda 5$ were measured as follows. A glass sample 10 mm thick having flat surfaces that were mutually parallel and had been optically polished was employed to measure the spectral transmittance over the wavelength range from 280 nm to 700 nm. The spectral transmittance was obtained by directing light rays of intensity A perpendicularly with respect to one of the optically polished flat surfaces, measuring the intensity B of the light rays exiting the other flat surface, and calculating B/A. Accordingly, the spectral transmittance included the reflectance loss of the light rays at the sample surfaces. The wavelength at which the spectral transmittance became 70% was adopted as $\lambda 70$, and the wavelength at which the spectral transmittance became 5% was adopted as $\lambda 5$. The measurement results are given in Table 1.

TABLE 1

| No. | $P^{5+}$ | $B^{3+}$ | $Si^{4+}$ | $Li^+$ | $Na^+$ | $K^+$ | $Rb^+$ | $Cs^+$ | $Mg^{2+}$ | $Ca^{2+}$ | $Sr^{2+}$ | $Ba^{2+}$ | $Zn^{2+}$ | $La^{3+}$ |
|---|---|---|---|---|---|---|---|---|---|---|---|---|---|---|
| 1 | 26.83 | 5.85 | 0.00 | 0.00 | 0.00 | 3.90 | 0.00 | 0.00 | 0.00 | 0.00 | 0.00 | 1.95 | 0.00 | 0.00 |
| 2 | 26.83 | 5.85 | 0.00 | 0.00 | 0.00 | 1.95 | 0.00 | 1.95 | 0.00 | 0.00 | 0.00 | 1.95 | 0.00 | 0.00 |
| 3 | 26.31 | 0.00 | 0.00 | 0.00 | 0.00 | 9.57 | 0.00 | 0.00 | 0.00 | 0.00 | 0.00 | 0.00 | 0.00 | 0.00 |
| 4 | 26.56 | 0.00 | 0.00 | 0.00 | 0.00 | 8.70 | 0.00 | 0.00 | 0.00 | 0.00 | 0.00 | 0.97 | 0.00 | 0.00 |
| 5 | 26.83 | 0.00 | 0.00 | 0.00 | 0.00 | 5.85 | 0.00 | 0.00 | 0.00 | 0.00 | 0.00 | 3.90 | 0.00 | 0.00 |
| 6 | 26.58 | 0.00 | 0.00 | 0.00 | 0.00 | 5.80 | 0.00 | 0.00 | 0.00 | 0.00 | 0.00 | 3.86 | 0.00 | 0.00 |

TABLE 1-continued

| | | | | | | | | | | | | | | |
|---|---|---|---|---|---|---|---|---|---|---|---|---|---|---|
| 7 | 26.57 | 0.00 | 0.00 | 0.00 | 7.73 | 0.00 | 0.00 | 0.00 | 0.00 | 0.00 | 0.00 | 1.93 | 0.00 | 0.00 |
| 8 | 26.59 | 0.00 | 0.00 | 0.00 | 6.76 | 1.93 | 0.00 | 0.00 | 0.00 | 0.00 | 0.00 | 1.93 | 0.00 | 0.00 |
| 9 | 27.64 | 0.00 | 0.00 | 0.00 | 4.02 | 2.01 | 0.00 | 0.00 | 0.00 | 0.00 | 0.00 | 2.01 | 0.00 | 0.00 |
| 10 | 26.90 | 0.00 | 0.00 | 0.00 | 1.71 | 1.71 | 0.00 | 0.00 | 0.00 | 0.00 | 0.00 | 4.40 | 0.00 | 0.00 |
| 11 | 27.10 | 2.96 | 0.00 | 0.00 | 0.49 | 0.00 | 0.00 | 0.00 | 0.00 | 0.00 | 0.00 | 4.43 | 0.00 | 0.00 |
| 12 | 27.09 | 2.96 | 0.00 | 0.00 | 0.00 | 0.49 | 0.00 | 0.00 | 0.00 | 0.00 | 0.00 | 4.43 | 0.00 | 0.00 |
| 13 | 26.81 | 2.93 | 0.00 | 0.00 | 0.00 | 0.00 | 0.00 | 2.93 | 0.00 | 0.00 | 0.00 | 1.95 | 0.00 | 0.00 |
| 14 | 26.45 | 2.88 | 0.00 | 0.00 | 0.48 | 0.00 | 0.00 | 0.00 | 0.00 | 0.00 | 0.00 | 4.33 | 0.00 | 0.00 |

| No. | $Gd^{3+}$ | $Y^{3+}$ | $Yb^{3+}$ | $Zr^{4+}$ | $Ti^{4+}$ | $Nb^{5+}$ | $Ta^{5+}$ | $Bi^{3+}$ | $W^{6+}$ | $Te^{4+}$ | $Ge^{4+}$ | $Al^{3+}$ | Total |
|---|---|---|---|---|---|---|---|---|---|---|---|---|---|
| 1 | 0.00 | 0.00 | 0.00 | 0.00 | 9.76 | 18.54 | 0.00 | 21.46 | 11.71 | 0.00 | 0.00 | 0.00 | 100.00 |
| 2 | 0.00 | 0.00 | 0.00 | 0.00 | 9.76 | 18.54 | 0.00 | 21.46 | 11.71 | 0.00 | 0.00 | 0.00 | 100.00 |
| 3 | 0.00 | 0.00 | 0.00 | 0.00 | 9.57 | 16.27 | 0.00 | 22.97 | 15.31 | 0.00 | 0.00 | 0.00 | 100.00 |
| 4 | 0.00 | 0.00 | 0.00 | 0.00 | 0.66 | 17.39 | 0.00 | 23.19 | 13.53 | 0.00 | 0.00 | 0.00 | 100.00 |
| 5 | 0.00 | 0.00 | 0.00 | 0.00 | 9.76 | 17.56 | 0.00 | 22.44 | 13.66 | 0.00 | 0.00 | 0.00 | 100.00 |
| 6 | 0.00 | 0.00 | 0.00 | 0.00 | 11.59 | 17.39 | 0.00 | 23.19 | 11.59 | 0.00 | 0.00 | 0.00 | 100.00 |
| 7 | 0.00 | 0.00 | 0.00 | 0.00 | 9.66 | 17.39 | 0.00 | 23.19 | 13.53 | 0.00 | 0.00 | 0.00 | 100.00 |
| 8 | 0.00 | 0.00 | 0.00 | 0.00 | 9.66 | 17.39 | 0.00 | 24.15 | 11.59 | 0.00 | 0.00 | 0.00 | 100.00 |
| 9 | 0.00 | 0.00 | 0.00 | 0.00 | 10.05 | 18.09 | 0.00 | 24.12 | 12.06 | 0.00 | 0.00 | 0.00 | 100.00 |
| 10 | 0.00 | 0.00 | 0.00 | 0.00 | 10.02 | 18.58 | 0.00 | 25.43 | 11.25 | 0.00 | 0.00 | 0.00 | 100.00 |
| 11 | 0.00 | 0.00 | 0.00 | 0.00 | 10.34 | 19.21 | 0.00 | 26.60 | 8.87 | 0.00 | 0.00 | 0.00 | 100.00 |
| 12 | 0.00 | 0.00 | 0.00 | 0.00 | 10.34 | 18.23 | 0.00 | 27.59 | 8.87 | 0.00 | 0.00 | 0.00 | 100.00 |
| 13 | 0.00 | 0.00 | 0.00 | 0.00 | 9.76 | 18.54 | 0.00 | 25.37 | 11.71 | 0.00 | 0.00 | 0.00 | 100.00 |
| 14 | 0.00 | 0.00 | 0.00 | 0.00 | 8.17 | 18.27 | 0.00 | 25.96 | 13.46 | 0.00 | 0.00 | 0.00 | 100.00 |

| No. | $Ti^{4+} + Nb^{5+} + W^{6+} + Bi^{3+} + Te^{4+}$ | $Ti^{4+} + Nb^{5+}$ | $W^{6+} + Bi^{3+}$ | $(Ti^{4+} + Nb^{5+})/(W^{6+} + Bi^{3+})$ | (A) $B^{3+} + Li^+ + Na^+ + K^+ + Rb^+ + Cs^+ + Mg^{2+} + Ca^{2+} + Sr^{2+} + Ba^{2+}$ | (B) $Ti^{4+} + Nb^{5+} + W^{6+} + Bi^{3+} + Te^{4+}$ | (A)/(B) | $Li^+ + Na^+ + K^+ + Rb^+ + Cs^+$ | Glass transition temperature (° C.) |
|---|---|---|---|---|---|---|---|---|---|
| 1 | 61.47 | 28.30 | 33.17 | 0.85 | 11.70 | 61.47 | 0.19 | 3.90 | 556 |
| 2 | 61.47 | 28.30 | 33.17 | 0.85 | 11.70 | 61.47 | 0.19 | 3.90 | 558 |
| 3 | 64.12 | 25.84 | 38.28 | 0.68 | 9.57 | 64.12 | 0.15 | 9.57 | 555 |
| 4 | 63.77 | 27.05 | 36.72 | 0.74 | 9.67 | 63.77 | 0.15 | 8.70 | 558 |
| 5 | 63.42 | 27.32 | 36.10 | 0.76 | 9.75 | 63.42 | 0.15 | 5.85 | 568 |
| 6 | 63.76 | 28.98 | 34.78 | 0.83 | 9.66 | 63.76 | 0.15 | 5.80 | 569 |
| 7 | 63.77 | 27.05 | 36.72 | 0.74 | 9.66 | 63.77 | 0.15 | 7.73 | 549 |
| 8 | 62.79 | 27.05 | 35.74 | 0.76 | 10.62 | 62.79 | 0.17 | 8.69 | 547 |
| 9 | 64.32 | 28.14 | 36.18 | 0.78 | 8.04 | 64.32 | 0.13 | 6.03 | 551 |
| 10 | 65.28 | 28.60 | 36.68 | 0.78 | 7.82 | 65.28 | 0.12 | 3.42 | 565 |
| 11 | 65.02 | 29.55 | 35.47 | 0.83 | 7.88 | 65.02 | 0.12 | 0.49 | 564 |
| 12 | 65.03 | 28.57 | 36.46 | 0.78 | 7.88 | 65.03 | 0.12 | 0.49 | 562 |
| 13 | 65.38 | 28.30 | 37.08 | 0.76 | 7.81 | 65.38 | 0.12 | 2.93 | 559 |
| 14 | 65.86 | 26.44 | 39.42 | 0.67 | 7.69 | 65.86 | 0.12 | 0.48 | 557 |

| No. | Liquidus temperature (° C.) | Viscosity at liquidus temperature (dPs · s) | Temperature at which glass exhibited viscosity of 10 dPa · s (° C.) | Specific gravity | nd | νd | λ 70 (nm) | λ 5 (nm) |
|---|---|---|---|---|---|---|---|---|
| 1 | 945 | 2.8 | 1030 | 5.26 | 2.061 | 17.4 | 490 | 421 |
| 2 | 945 | 2.8 | 1030 | 5.27 | 2.058 | 17.5 | 487 | 419 |
| 3 | 935 | 3.2 | 1020 | 5.39 | 2.067 | 16.9 | 502 | 424 |
| 4 | 925 | 3.8 | 1020 | 5.41 | 2.073 | 17.0 | 475 | 420 |
| 5 | 925 | 4.0 | 1025 | 5.44 | 2.070 | 17.3 | 487 | 422 |
| 6 | 965 | 2.0 | 1030 | 5.42 | 2.077 | 17.2 | 493 | 423 |
| 7 | 950 | 2.4 | 1025 | 5.50 | 2.088 | 17.0 | 484 | 418 |
| 8 | 960 | 2.0 | 1020 | 5.44 | 2.077 | 17.2 | 473 | 417 |
| 9 | 950 | 2.4 | 1025 | 5.46 | 2.082 | 17.1 | 477 | 417 |
| 10 | 945 | 3.0 | 1030 | 5.61 | 2.097 | 17.1 | 482 | 418 |
| 11 | 950 | 3.8 | 1040 | 5.59 | 2.102 | 17.3 | 493 | 422 |
| 12 | 950 | 3.8 | 1040 | 5.62 | 2.102 | 17.3 | 491 | 422 |
| 13 | 945 | 3.8 | 1045 | 5.54 | 2.088 | 17.1 | 496 | 421 |
| 14 | 945 | 4.0 | 1040 | 5.70 | 2.102 | 17.2 | 498 | 421 |

Example 2

Glass starting materials were heated, melted, refined, and homogenized to obtain optical glass Nos. 1 to 14 in the same manner as in Example 1, and the glass melt obtained was caused to flow into a casting mold and quenched to mold into a glass block. Next, the glass block was annealed, cut, and ground to prepare a press molding glass material.

Example 3

The glass materials for press molding that were prepared in Example 2 were heated, softened, and press molded by a known method using a pressing mold to prepare optical element blanks such as lens blanks and prism blanks.

The optical element blanks obtained were precision annealed and the refractive indexes thereof were precisely adjusted to the desired refractive indexes. They were then finished into lenses and prisms by known grinding and polishing methods.

Example 4

The surfaces of the press molding glass materials prepared in Example 2 were polished to prepare press molding glass materials for precision press molding. These glass materials were heated and precision press molded to obtain aspherical lenses. The precision press molding was conducted by a known method.

Various optical elements such as lenses and prisms were prepared in this manner.

When imaging optical systems were assembled with the lenses obtained in Examples 3 and 4, it was possible to obtain an imaging device with good color reproduction properties.

When portable telephone-mounted imaging units and optical pickup units were prepared using the lenses obtained, units with extremely little focal position displacement caused by vibration could be obtained.

The optical element of the present Example permits good correction of chromatic aberration when combined with an optical element of low dispersion glass. It is effective for high functionality and compactness to various optical devices, including imaging devices.

An aspect of the present invention can provide optical glass having a high refractive index that is suitable as an optical element material for use in correcting chromatic aberration, and can provide a press molding glass material and an optical element employing the above optical glass.

The implementation modes that have been disclosed herein are but examples in all regards and are not to be considered as limitations. The scope of the present invention is disclosed by the scope of the claims and not by the description given above. All modifications falling within the meaning and scope that are equivalent to the scope of the claims are intended to be covered.

For example, optical glass according to an aspect of the present invention can be prepared by applying the compositional adjustment disclosed in the specification to the glass compositions exemplified above.

In addition, any combination of two or more of the matters that have been described as an exemplified or desirable scope in the specification is, of course, possible.

The invention claimed is:

1. An optical oxide glass, comprising cationic components that include:
   10 to 40 cation % of $P^{5+}$;
   50 cation % or more of a combined content of $Ti^{4+}$, $Nb^{5+}$, $W^{6+}$, $Bi^{3+}$, and $Te^{4+}$, a ratio of a combined content of $Ti^{4+}$ and $Nb^{5+}$ to a combined content of $W^{6+}$ and $Bi^{3+}$, $(Ti^{4+}+Nb^{5+})/(W^{6+}Bi^{3+})$, being 0.9 or less;
   a combined content of $B^{3+}$, $Li^+$, $Na^+$, $K^+$, $Rb^+$, $Cs^+$, $Mg^{2+}$, $Ca^{2+}$, $Sr^{2+}$, $Ba^{2+}$, and $Zn^{2+}$ that is ⅓ or less of the combined content of $Ti^{4+}$, $Nb^{5+}$, $W^{6+}$, $Bi^{3+}$, and $Te^{4+}$; and
   more than 0% of a combined content of $Li^+$, $Na^+$, $K^+$, $Rb^+$, and $Cs^+$; wherein
   the optical glass has a refractive index of 2.02 or more.

2. The optical glass according to claim 1, which comprises 0 to 4 cation % of $Te^{4+}$ as a cation component.

3. The optical glass according to claim 1, which has an Abbé number vd of 18.0 or less.

4. The optical glass according to claim 1, which has a liquidus temperature of 1,100° C. or less.

5. A method of manufacturing optical glass, comprising:
   melting glass starting materials by heating to prepare glass melt, refining the glass melt, and molding the glass melt that has been refined; and
   blending the glass starting materials so as to obtain the optical glass according to claim 1.

6. The method of manufacturing optical glass according to claim 5, wherein the melting is conducted using a glass melting vessel made of platinum, platinum alloy, gold, or gold alloy.

7. A press molding glass material, comprising the optical glass according to claim 1.

8. An optical element, comprising the optical glass according to claim 1.

9. A method of manufacturing an optical element, comprising:
   preparing optical glass by processing the optical glass according to claim 1; and
   processing the optical glass that has been prepared to provide an optical element.

10. The optical glass according to claim 1, wherein a liquidus temperature is 960° C. or less.

11. The optical glass according to claim 1, wherein the ratio of $(Ti^{4+}+Nb^{5+})/(W^{6+}+Bi^{3+})$ ranges from 0.74 to 0.90.

12. The optical glass according to claim 1, wherein the combined content of $B^{3+}$, $Li^+$, $Na^+$, $K^+$, $Rb^+$, $Cs^+$, $Mg^{2+}$, $Ca^{2+}$, $Sr^{2+}$, $Ba^{2+}$, and $Zn^{2+}$ is 0.12 to 0.225 of the combined content of $Ti^{4+}$, $Nb^{5+}$, $W^{6+}$, $Bi^{3+}$, and $Te^{4+}$.

13. An optical oxide glass, comprising cationic components that include:
   10 to 40 cation % of $P^{5+}$;
   50 cation % or more of a combined content of $Ti^{4+}$, $Nb^{5+}$, $W^{6+}$, $Bi^{3+}$, and $Te^{4+}$, a ratio of a combined content of $Ti^{4+}$ and $Nb^{5+}$ to a combined content of $W^{6+}$ and $Bi^{3+}$, $(Ti^{4+}+Nb^{5+})/(W^{6+}+Bi^{3+})$, ranging from 0.74 to 0.90;
   a combined content of $B^{3+}$, $Li^+$, $Na^+$, $K^+$, $Rb^+$, $Cs^+$, $Mg^{2+}$, $Ca^{2+}$, $Sr^{2+}$, $Ba^{2+}$, and $Zn^{2+}$ that is 0.12 to 0.225 of the combined content of $Ti^{4+}$, $Nb^{5+}$, $W^{6+}$, $Bi^{3+}$, and $Te^{4+}$; and
   more than 0% of a combined content of $Li^+$, $Na^+$, $K^+$, $Rb^+$, and $Cs^+$; wherein
   the optical glass has a refractive index of 2.02 or more and the liquidus temperature is 960° C. or less.

\* \* \* \* \*